(12) United States Patent
Zheng et al.

(10) Patent No.: US 8,386,236 B2
(45) Date of Patent: Feb. 26, 2013

(54) METHOD FOR PROMPTING BY SUGGESTING STROKE ORDER OF CHINESE CHARACTER, ELECTRONIC DEVICE, AND COMPUTER PROGRAM PRODUCT

(75) Inventors: Yong-Ping Zheng, Shanghai (CN); Hua-Feng Mai, Shanghai (CN); Tony Tsai, Taipei (TW)

(73) Assignee: Inventec Appliances Corp., New Taipei (TW)

( * ) Notice: Subject to any disclaimer, the term of this patent is extended or adjusted under 35 U.S.C. 154(b) by 267 days.

(21) Appl. No.: 12/859,465

(22) Filed: Aug. 19, 2010

(65) Prior Publication Data

US 2011/0046942 A1 Feb. 24, 2011

(30) Foreign Application Priority Data

Aug. 19, 2009 (TW) .............................. 98127900 A

(51) Int. Cl.
*G06F 17/20* (2006.01)
(52) U.S. Cl. ..................... 704/8; 704/1; 704/2
(58) Field of Classification Search ............... 704/2–8
See application file for complete search history.

(56) References Cited

U.S. PATENT DOCUMENTS

| | | | | |
|---|---|---|---|---|
| 5,197,810 A * | 3/1993 | Zhang et al. | .................. | 400/110 |
| 5,426,726 A * | 6/1995 | Horiuchi et al. | ............. | 345/467 |
| 5,796,867 A * | 8/1998 | Chen et al. | .................... | 382/187 |
| 6,201,552 B1 * | 3/2001 | Itou et al. | ...................... | 345/468 |
| 6,970,599 B2 * | 11/2005 | Longe et al. | ................... | 382/185 |
| 7,013,258 B1 * | 3/2006 | Su et al. | ............................. | 704/1 |
| 7,257,528 B1 * | 8/2007 | Ritchie et al. | ..................... | 704/7 |
| 7,398,199 B2 * | 7/2008 | Gong | ................................. | 704/8 |
| 7,403,888 B1 * | 7/2008 | Wang et al. | ...................... | 704/2 |
| 7,809,550 B1 * | 10/2010 | Barrows | ........................... | 704/4 |
| 2002/0193984 A1 * | 12/2002 | Sugano | ............................. | 704/2 |
| 2008/0215307 A1 * | 9/2008 | Li et al. | ............................ | 704/3 |
| 2008/0215308 A1 * | 9/2008 | Li et al. | ............................ | 704/3 |
| 2008/0297480 A1 * | 12/2008 | Lee | ................................. | 345/169 |
| 2009/0174581 A1 * | 7/2009 | Zang | ............................... | 341/23 |
| 2009/0187399 A1 * | 7/2009 | O'Dell | ............................. | 704/8 |

* cited by examiner

*Primary Examiner* — Douglas Godbold
(74) *Attorney, Agent, or Firm* — J.C. Patents

(57) ABSTRACT

A method for prompting by suggesting the stroke order of a Chinese character, an electronic device, and a computer program product are provided. The electronic device includes a database for storing codes of Chinese characters, and at least one stroke order of at least one handwriting of each of the Chinese characters. In the present method, when a character input through a phonetic transcription input method installed in the electronic device is identified, at least one Chinese character code corresponding to the input character is obtained from the database, and a stroke order of a handwriting of the input character from the database is shown according to the Chinese character code. Accordingly, a user is assisted to memorize the stroke orders of Chinese characters when the user inputs Chinese characters.

17 Claims, 4 Drawing Sheets

METHOD FOR PROMPTING BY SUGGESTING STROKE ORDER OF CHINESE CHARACTER, ELECTRONIC DEVICE, AND COMPUTER PROGRAM PRODUCT

CROSS-REFERENCE TO RELATED APPLICATION

This application claims the priority benefit of Taiwan application serial no. 98127900, filed on Aug. 19, 2009. The entirety of the above-mentioned patent application is hereby incorporated by reference herein and made a part of this specification.

BACKGROUND OF THE INVENTION

1. Field of the Invention

The present invention generally relates to a phonetic transcription input method of an electronic device, and more particularly, to a mnemonic method of Chinese character writing, an electronic device, and a computer program product.

2. Description of Related Art

Along with the development of information technology, many government offices, private companies, and educational institutions have entered the electronic age, and people have gotten used to writing and managing their documents through computer systems and electronic devices that come with text processing functions. An input software is one of the most indispensable tools to be used for inputting characters into a computer system or an electronic device. In order to allow the users to input characters faster and more conveniently, the design of input methods is more and more focused on how to input a character with the least number of button presses.

Generally speaking, among all the input software provided by computer systems and electronic devices, the phonetic transcription input method based on pronunciation is the easiest one since it is not needed to memorize the compositions of Chinese characters, and accordingly this input method is broadly accepted by the users. However, after using the phonetic transcription input method for inputting Chinese characters for some time, a user may get used to obtaining a candidate character list according to the pronunciation of the character and then selecting the character from the candidate character list. As a result, wrong words with the same pronunciations may be input, or the user may even forget how to correctly write Chinese characters. Accordingly, the user may not be able to handwrite Chinese characters correctly when he or she has to do so.

SUMMARY OF THE INVENTION

Accordingly, the present invention is directed to a method for prompting by suggesting the stroke order of a Chinese character, wherein a user is assisted to memorize the composition of the Chinese character when the user inputs the Chinese character through a phonetic transcription input method.

The present invention is also directed to an electronic device which can enhance the memory of a user to the writing process of Chinese characters.

The present invention is further directed to a computer program product including a plurality of program instructions, wherein the program instructions are suitable for being loaded into an electronic device such that the electronic device can show the stroke order of a Chinese character input by a user.

The present invention provides a method for prompting by suggesting a stroke order of a Chinese character. The method is suitable for an electronic device having a phonetic transcription input method installed. The electronic device includes a database for storing codes of Chinese characters and at least one stroke order of at least one handwriting of each of the Chinese characters. In the present method, when a character input through the phonetic transcription input method is identified, at least one Chinese character code corresponding to the input character is obtained from the database, and a stroke order of a handwriting of the input character from the database is shown corresponding to the Chinese character code.

According to an embodiment of the present invention, the at least one handwriting and the at least one stroke order are stored as an animation file or an image file.

According to an embodiment of the present invention, the at least one handwriting belongs to a vector font and the at least one stroke order is derived from the at least one handwriting of a type in the vector font.

According to an embodiment of the present invention, the step of showing the stroke order of the handwriting of the input character from the database is performed in order to follow an instruction to prompt.

According to an embodiment of the present invention, the electronic device provides a handwriting input function, the at least one handwriting of each of the Chinese characters is stored in the database, and the present method further includes when the handwriting input function is started and a handwritten character is input, obtaining at least one Chinese character code corresponding to the handwritten character from the database and recording an input process of the handwritten character into the at least one handwriting of the handwritten character and the at least one stroke order of the at least one handwriting of the handwritten character in the database, according to the Chinese character code corresponding to the handwritten character.

According to an embodiment of the present invention, the at least one stroke order of the at least one handwriting of the Chinese characters includes a predetermined stroke order, or the predetermined stroke order and a user-defined stroke order of the handwritten character, and the at least one handwriting of the Chinese characters stored in the database includes a predetermined handwriting, or the predetermined handwriting and a user-defined handwriting of the handwritten character.

According to an embodiment of the present invention, the step of showing the stroke order of the handwriting of the input character includes showing the stroke order of the handwriting of the input character within a specific area of a screen of the electronic device.

According to an embodiment of the present invention, the phonetic transcription input method includes a Mandarin Phonetic Symbols input method or a Hanyu Pinyin input method.

The present invention also provides an electronic device including a screen, a database, a phonetic transcription input method module, and a processing module. The database is used for storing codes of Chinese characters and at least one stroke order of at least one handwriting of each of the Chinese characters. The phonetic transcription input method module is used for providing a phonetic transcription input method and for identifying a character input through the phonetic transcription input method. The processing module is connected to the screen, the database, and the phonetic transcription input method module, the processing module is used for obtaining at least one Chinese character code corresponding to the input character from the database and showing a stroke order of a handwriting of the input character from the database on the screen according to the Chinese character code.

According to an embodiment of the present invention, the at least one handwriting and the at least one stroke order are stored as an animation file or an image file.

According to an embodiment of the present invention, the at least one handwriting belongs to a vector font and the at least one stroke order is derived from the at least one handwriting of a type in the vector font.

According to an embodiment of the present invention, the processing module is used for showing the stroke order of the handwriting of the input character from the database on the screen in order to follow an instruction to prompt.

According to an embodiment of the present invention, the at least one handwriting of each of the Chinese characters is stored in the database, and the electronic device further includes a handwriting input module connected to the processing module, wherein the handwriting input module is used for starting a handwriting input function and receiving a handwritten character. When the processing module detects the handwritten character, it obtains at least one Chinese character code corresponding to the handwritten character from the database and records the input process of the handwritten character into the at least one handwriting of the handwritten character and the at least one stroke order of the at least one handwriting of the handwritten character in the database according to the Chinese character code corresponding to the handwritten character.

According to an embodiment of the present invention, the at least one stroke order of the at least one handwriting of the Chinese characters includes a predetermined stroke order, or the predetermined stroke order and a user-defined stroke order of the handwritten character, and the at least one handwriting of the Chinese characters stored in the database includes a predetermined handwriting, or the predetermined handwriting and a user-defined handwriting of the handwritten character.

According to an embodiment of the present invention, the processing module is used for showing the stroke order of the handwriting of the input character within a specific area of the screen.

The present invention further provides a computer program product including a plurality of program instructions suitable for being loaded into an electronic device having a phonetic transcription input method installed and comprising a database for storing codes of Chinese characters and at least one stroke order of at least one handwriting of each of the Chinese characters. The electronic device is used for executing the program instructions to perform the following steps: identifying a character input through the phonetic transcription input method, obtaining at least one Chinese character code corresponding to the input character from the database, and showing a stroke order of a handwriting of the input character from the database according to the Chinese character code.

As described above, in the present invention, when a user inputs a Chinese character through a phonetic transcription input method, a stroke order of the Chinese character is automatically shown on a screen. Thereby, the memory of the user to the composition of the Chinese character is enhanced while the user inputs the Chinese character, so that the user will not forget how to correctly write Chinese characters due to the usage of the phonetic transcription input method.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
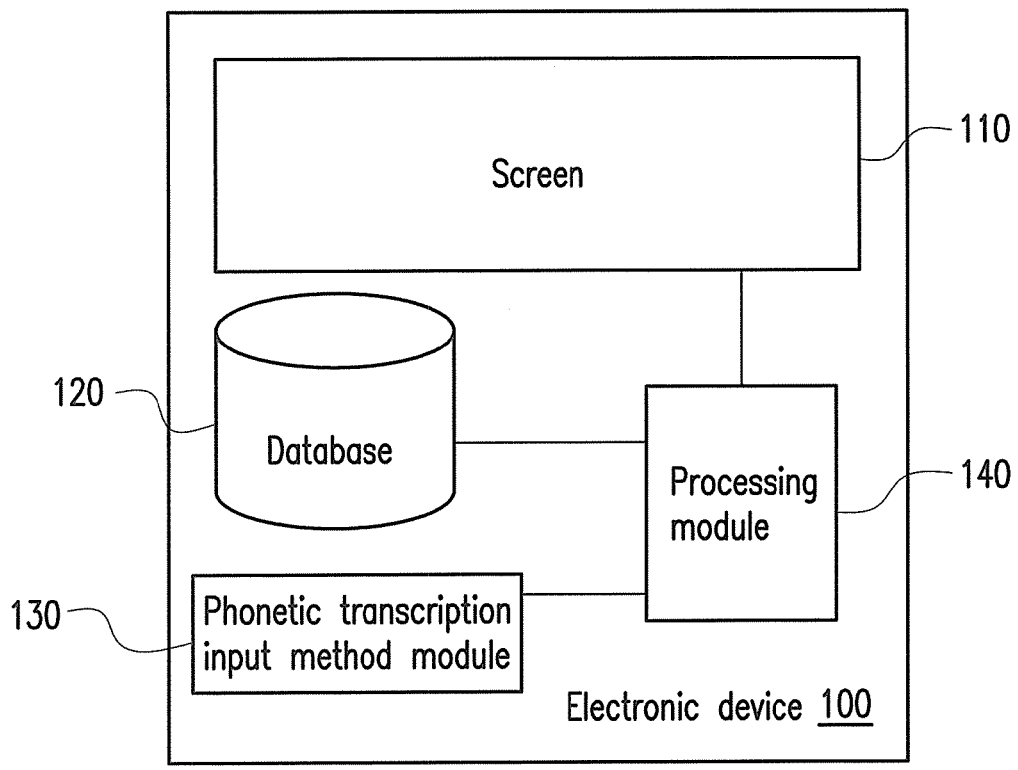
FIG. 1 is a diagram of an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of an electronic device according to an embodiment of the present invention. Referring to FIG. 1, the electronic device 100 includes a screen 110, a database 120, a phonetic transcription input method module 130, and a processing module 140. The electronic device 100 may be a cell phone, a personal digital assistant (PDA), a smart phone, or a computer system. However, the scope of the electronic device 100 is not limited in the present invention.

In the present embodiment, the screen 110 may be a liquid crystal screen or a touch screen for displaying an operation image of the electronic device 100. The database 120 may be a storage unit in the electronic device 100 or an external storage device (for example, an external memory card). The database 120 is used for storing codes of Chinese characters and at least one stroke order of at least one handwriting of each of the Chinese characters. A code of Chinese character is referred to as a Chinese character code for short. The Chinese character codes may be Unicode characters, and the stroke order and handwriting corresponding to each Chinese character code may be stored as an animation file or an image file. However, the file type of the stroke order and the handwriting is not limited in the present invention. In an embodiment, the handwriting belongs to a vector font (the vector font is also called a scalable font), and the stroke order is derived from the handwriting of a type in the vector font so that the stroke order can be clearly presented even when it is zoomed in or out according to the handwriting. However, the font of the handwriting may belong to a bit-mapped font, and the scope of the font type is not limited in the present invention.

The phonetic transcription input method module 130 includes a Chinese phonetic transcription input method software, which installs a phonetic transcription input method into the electronic device 100 and provides a phonetic transcription input function when the electronic device 100 is in operation. In the present embodiment, the phonetic transcription input method provided by the phonetic transcription input method module 130 may be a Mandarin Phonetic Symbols input method or a Hanyu Pinyin input method. However, the type of the phonetic transcription input method is not limited in the present invention. The phonetic transcription input method module 130 can identify a character input through the phonetic transcription input method according to a vocabulary provided by the phonetic transcription input method and a user's input action.

The processing module 140 is respectively connected to the screen 110, the database 120, and the phonetic transcription input method module 130. Every time when a user inputs a Chinese character through the phonetic transcription input method, the processing module 140 searches in the database 120 to show the stroke order corresponding to the Chinese character on the screen 110.

The electronic device 100 illustrated in FIG. 1 automatically shows the stroke order of each Chinese character when the user inputs Chinese characters through the phonetic transcription input method, so as to enhance the memory of the user to the composition of the Chinese characters. Below, another embodiment of the present invention will be described in detail in order to further explain the operation of the electronic device 100.

Figure 2:
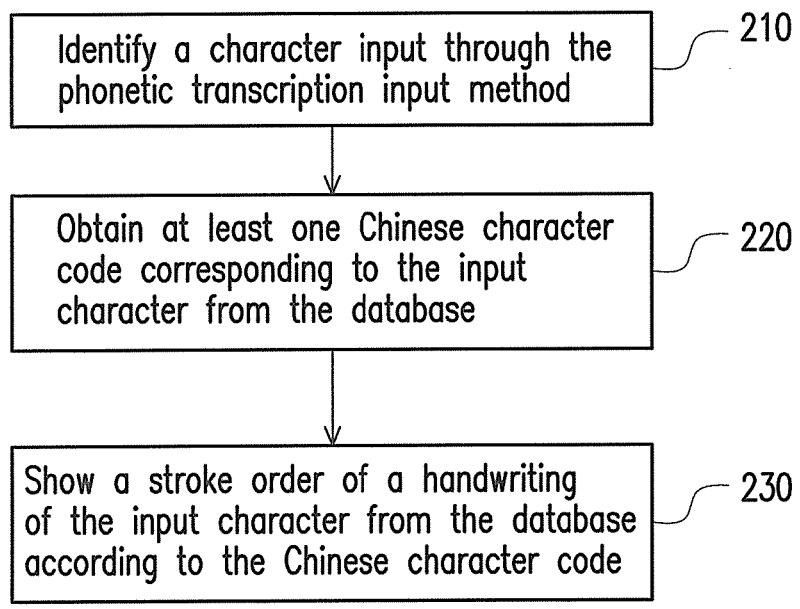
FIG. 2 and FIG. 3 are flowcharts of a method for prompting by suggesting a stroke order of a Chinese character according to an embodiment of the present invention.

FIG. 2 is a flowchart of a method for prompting by suggesting the stroke order of a Chinese character according to an embodiment of the present invention. Referring to both FIG. 1 and FIG. 2, in the present embodiment, the electronic device 100 has a database 120, wherein the database 120 stores codes of Chinese characters and at least one stroke order of at least one handwriting of each of the Chinese characters.

Once the electronic device 100 is powered on, the phonetic transcription input method module 130 identifies a character input by the user when the user inputs the character through the phonetic transcription input method provided by the phonetic transcription input method module 130 (step 210).

Then, the processing module 140 compares the input character with each Chinese character code stored in the database 120 to obtain the Chinese character code corresponding to the input character (step 220). To be specific, the processing module 140 first obtains an input character code corresponding to the input character, and then selects the Chinese character code the same as the input character code among all the Chinese character codes stored in the database 120.

Finally, the processing module 140 shows a stroke order of a handwriting of the input character from the database 120 on the screen 110 according to the obtained Chinese character code (step 230). The processing module 140 may show the stroke order of the handwriting of the input character within a specific area of the screen 110, wherein the specific area may be a partial screen area or a full screen area. However, the definition of the specific area is not limited in the present invention.

As shown in FIG. 2, after the user selects a character through the phonetic transcription input method, the electronic device 100 instantly shows the stroke order of this character. However, if the user inputs a phrase containing a plurality of characters through the phonetic transcription input method, the processing module 140 obtains the corresponding handwritings and stroke orders word by word and sequentially shows these stroke orders. Accordingly, the user can inspect the writing process of each character at the same time when the user inputs the character.

Figure 3:
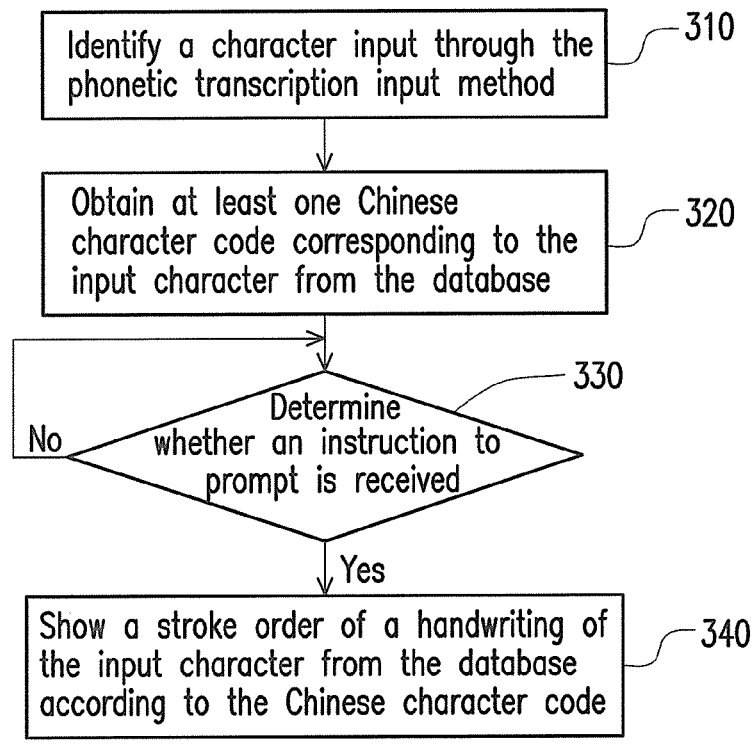

FIG. 3 is a flowchart of a method for prompting by suggesting a stroke order of a Chinese character according to an embodiment of the present invention. The steps 310~320 in FIG. 3 are the same or similar to the steps 210~220 in FIG. 2 therefore will not be described herein. In the present embodiment, after the phonetic transcription input method module 130 identifies the character input by the user and the processing module 140 obtains the Chinese character code corresponding to the input character from the database 120, the processing module 140 constantly determines whether an instruction to prompt is received (step 330).

In an embodiment, the user presses a specific button on the electronic device 100 to trigger the instruction to prompt. In another embodiment, the user sets a time point for displaying the stroke order of an input character in advance, and the instruction to prompt is automatically triggered at this time point so that the processing module 140 can receive the instruction to prompt.

After the processing module 140 receives the instruction to prompt (i.e., the user wants to view the stroke order), the processing module 140 shows the corresponding stroke order of the handwriting of the input character from the database 120 according to the obtained Chinese character code (step 340). That is, the processing module 140 may show the stroke order in order to follow the instruction to prompt. In this embodiment, the stroke order is shown within a specific area on the screen 110. The specific area may be a partial screen area or a full screen area. However, the definition of the specific area is not limited in the present invention.

In the present embodiment, the electronic device 100 does not show the corresponding stroke order right after a character is input. Instead, a user is allowed to determine when he or she wants to see the stroke order. Accordingly, the stroke order can be prompted more flexibly, and the operation of the electronic device 100 is made more convenient.

Figure 4:
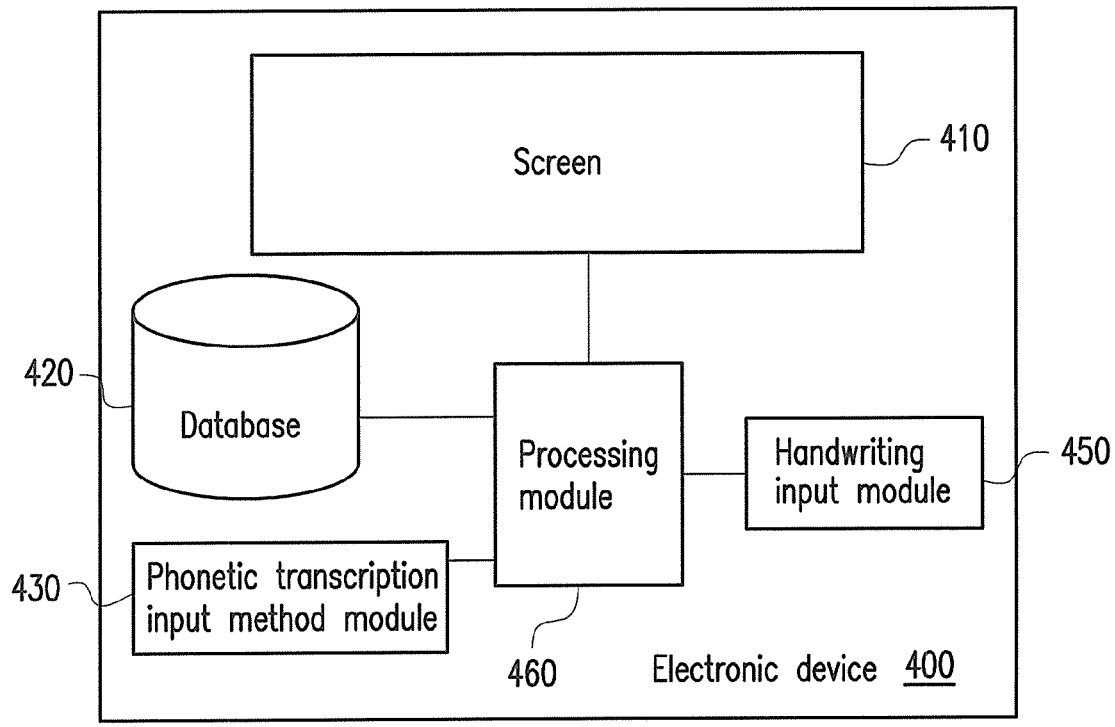
FIG. 4 is a diagram of an electronic device according to another embodiment of the present invention.

FIG. 4 is a diagram of an electronic device according to another embodiment of the present invention. Referring to FIG. 4, in the present embodiment, the electronic device 400 includes a screen 410, a database 420, a phonetic transcription input method module 430, a handwriting input module 450, and a processing module 460. The electronic device 400 may be a cell phone, a PDA, a smart phone, or a computer. However, the present invention is not limited thereto.

The screen 410 and the phonetic transcription input method module 430 illustrated in FIG. 4 offer the same or similar functions as the screen 110 and the phonetic transcription input method module 130 illustrated in FIG. 1 therefore will not be described herein. In the electronic device 400, the database 420 stores codes of Chinese characters, at least one stroke order of at least one handwriting of each of the Chinese characters, wherein the at least one handwriting of each of the Chinese characters is also stored in the database 420. The handwriting input module 450 is connected to the processing module 460. The handwriting input module 450 provides and starts the handwriting input function of the electronic device 400 for receiving handwritten characters. When the electronic device 400 receives a handwritten character input through the handwriting input module 450, the processing module 460 obtains the Chinese character code corresponding to the handwritten character from the database 420 and records an input process of the handwritten character into the at least one handwriting of the handwritten character and the at least one stroke order of the at least one handwriting of the handwritten character in the database 420 according to the Chinese character code corresponding to the handwritten character. It should be noted that herein the processing module 460 records the input process of the handwritten character as the stroke order and the handwriting corresponding to the Chinese character code. The input process may not be the final result generated by the handwriting input. Instead, it may contain the stroke order and writing process of the character. The user can constantly expand the content of the database 420 through the method described above.

In other words, if the user never use the handwriting input module 450 to input a handwritten character, the stroke order of the Chinese character code in the database 420 is a standard predetermined stroke order, while the corresponding handwriting is a standard predetermined handwriting. However, if the user uses the handwriting input module 450 to input a handwritten character, the stroke order of the handwriting of the Chinese character stored in the database 420 may include the predetermined stroke order and a user-defined stroke order of the handwritten character, and the handwriting of the Chinese character stored in the database 420 may include the predetermined handwriting and a user-defined handwriting of the handwritten character.

Figure 5:
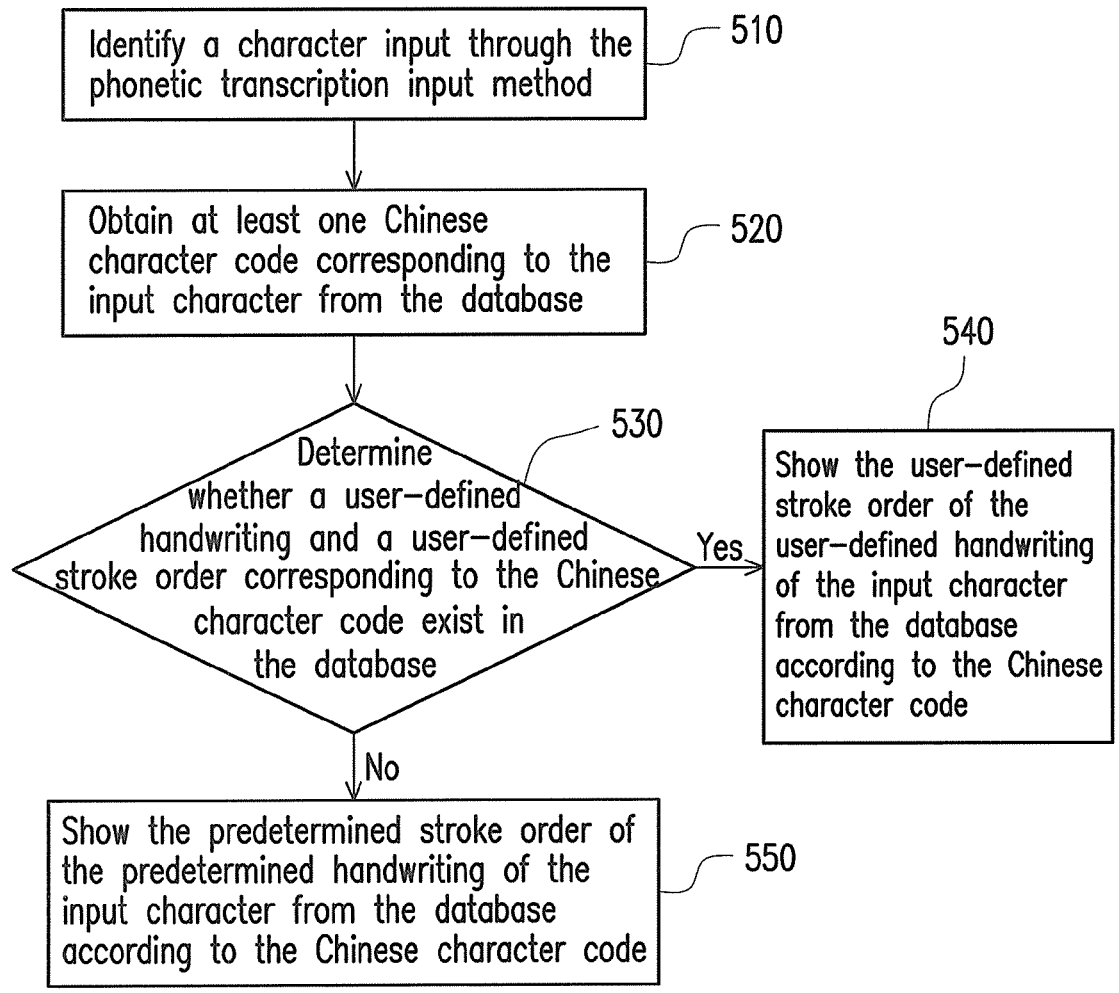
FIG. 5 and FIG. 6 are flowcharts of a method for prompting by suggesting a stroke order of a Chinese character according to another embodiment of the present invention.

FIG. 5 is a detailed flowchart illustrating how the electronic device 400 shows the corresponding stroke order when a user operates the electronic device 400 and inputs a Chinese character. Referring to both FIG. 4 and FIG. 5, in the present embodiment, the database 420 stores a plurality of Chinese character codes and at least one stroke order and at least one handwriting corresponding to each of the Chinese character codes, wherein the stroke orders may include standard predetermined stroke orders and user-defined stroke orders, and the handwritings may include standard predetermined handwritings and user-defined handwritings.

The phonetic transcription input method module 430 identifies a character input by the user through the phonetic transcription input method (step 510). Then, the Chinese character code corresponding to the character is obtained by the processing module 460 from the database 420 (step 520). Whether a user-defined stroke order and a user-defined handwriting corresponding to the Chinese character code exist in the database 420 (i.e., whether the user ever uses the handwriting input module 450 to add a user-defined stroke order and a user-defined handwriting into the database 420) is determined by the processing module 460 (step 530).

If a user-defined stroke order and a user-defined handwriting corresponding to the Chinese character code exist in the database 420, the processing module 460 shows the corresponding user-defined stroke order of the user-defined handwriting of the input character from the database 420 according to the Chinese character code (step 540). Then the user-defined stroke order is shown within a specific area of the screen 410, and the specific area may be a partial screen area or a full screen area.

However, since the user may not use the handwriting input module 450 to input all Chinese characters, if no user-defined stroke order or handwriting corresponding to the Chinese character code exists in the database 420, the processing module 460 shows the corresponding predetermined stroke order of the predetermined handwriting of the input character from the database 420 according to the Chinese character code (step 550). Then the predetermined stroke order is shown within the specific area of the screen 410, and the specific area may be a partial screen area or a full screen area.

As described above, when a user inputs a character through the phonetic transcription input method, the processing module 460 first searches in the database 420 to determine whether the input character has a corresponding user-defined stroke order and then shows the user-defined stroke order or the predetermined stroke order accordingly.

Figure 6:
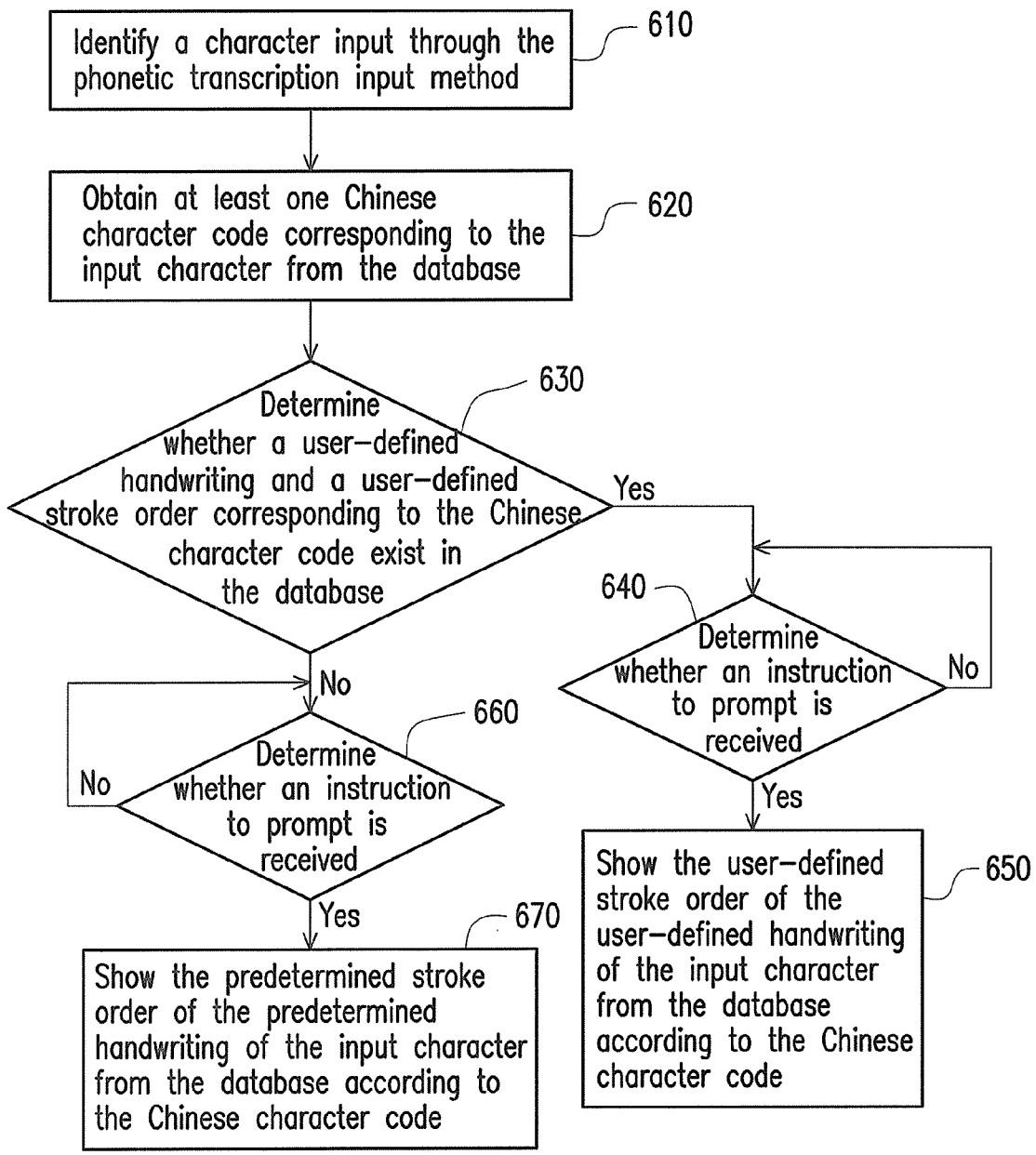

FIG. 6 is a flowchart of a method for prompting by suggesting the stroke order of a Chinese character according to another embodiment of the present invention. The steps 610~630 illustrated in FIG. 6 are the same or similar to those described in foregoing embodiments therefore will not be described herein. In the present embodiment, after the phonetic transcription input method module 430 identifies the character input by the user through the phonetic transcription input method, the processing module 460 constantly determines whether an instruction to prompt is received if it determines that the Chinese character code has a corresponding user-defined stroke order and a corresponding user-defined handwriting in the database 420 (step 640). After the instruction to prompt is correctly received, the processing module 460 shows the user-defined stroke order of the user-defined handwriting of the input character according to the Chinese character code within the specific area of the screen 410 (step 650).

If the processing module 460 determines that the Chinese character code does not have any corresponding user-defined stroke order or user-defined handwriting in the database 420, the processing module 460 constantly determines whether the instruction to prompt is received (step 660). After the instruction to prompt is received, the processing module 460 shows the corresponding predetermined stroke order of the predetermined handwriting of the input character according to the Chinese character code within the specific area of the screen 410 (step 670).

In the present embodiment, the instruction to prompt for triggering the processing module 460 to show the predetermined or user-defined stroke order of the input character may be triggered by a specific button on the electronic device 400. In other words, when the user presses the specific button and accordingly triggers the instruction to prompt, the processing module 460 shows the predetermined or user-defined stroke order on the screen 410. Besides, the user may also preset a time point for showing the stroke order, and the instruction to prompt is sent to the processing module 460 when the time point is reached to notify the processing module 460 that the predetermined or user-defined stroke order of the input character should be shown on the screen 410.

The present invention further provides a computer program product for executing foregoing method for prompting by suggesting a stroke order of a Chinese character. The computer program product is composed of a plurality of program instructions (for example, setting program instructions or deployment program instructions, etc). These program instructions can be loaded into an electronic device having a phonetic transcription input method installed and executed by the same to accomplish the method for prompting by suggesting the stroke orders of Chinese characters described above and to provide the function described in foregoing embodiments to the electronic device.

As described above, the present invention provides a method for prompting by suggesting a stroke order of a Chinese character, an electronic device, and a computer program product, so that a mnemonic process by prompting a user by suggesting the stroke order of a Chinese character can be added to any Chinese phonetic transcription input method installed. Therefore when the user inputs the Chinese character by using the electronic device, the stroke order of the Chinese character is suggested to enhance the memory of the user as to the composition of the Chinese character. Thereby, the user will not forget about how to write Chinese characters correctly due to the usage of the phonetic transcription input method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for prompting by suggesting a stroke order of a Chinese character on an electronic device having a phonetic transcription input method installed, wherein the electronic device comprises a database for storing codes of Chinese characters, at least one stroke order of at least one handwriting of each of the Chinese characters, and the at least one handwriting of each of the Chinese characters, and the method comprises:

starting a handwriting input function provided by the electronic device;

identifying, by the electronic device, a handwritten character input through the phonetic transcription input method;

obtaining, by the electronic device, at least one Chinese character code corresponding to the handwritten character from the database;

recording, by the electronic device, an input process of the handwritten character into the at least one handwriting of the handwritten character and the at least one stroke order of the at least one handwriting of the handwritten character in the database, according to the Chinese character code corresponding to the handwritten character; and showing, by the electronic device, a stroke order of a handwriting of the input character from the database according to the Chinese character code.

2. The method according to claim 1, wherein the at least one handwriting and the at least one stroke order are stored as an animation file or an image file.

3. The method according to claim 1, wherein the at least one handwriting belongs to a vector font and the at least one stroke order is derived from the at least one handwriting of a type in the vector font.

4. The method according to claim 1, wherein the step of showing the stroke order of the handwriting of the input character from the database is performed in order to follow an instruction to prompt.

5. The method according to claim 1, wherein the at least one stroke order of the at least one handwriting of the Chinese characters comprises a predetermined stroke order, or the predetermined stroke order and a user-defined stroke order of the handwritten character, and the at least one handwriting of the Chinese characters stored in the database comprises a predetermined handwriting, or the predetermined handwriting and a user-defined handwriting of the handwritten character.

6. The method according to claim 1, wherein the step of showing the stroke order of the handwriting of the input character comprises:

showing the stroke order of the handwriting of the input character within a specific area of a screen of the electronic device.

7. The method according to claim 1, wherein the phonetic transcription input method comprises a Mandarin Phonetic Symbols input method or a Hanyu Pinyin input method.

8. An electronic device, comprising:

a screen;

a database, for storing codes of Chinese characters, and at least one stroke order of at least one handwriting of each of the Chinese characters, and the at least one handwriting of each of the Chinese characters;

a handwriting input module, for starting a handwriting input function provided by the electronic device;

a phonetic transcription input method module, for providing a phonetic transcription input method, and for identifying a handwritten character input through the phonetic transcription input method; and a processing module, coupled to the screen, the database, the handwriting input module, and the phonetic transcription input method module, for obtaining at least one Chinese character code corresponding to the handwritten character from the database wherein when the handwritten character is received, recording an input process of the handwritten character into the at least one handwriting of the handwritten character and the at least one stroke order of the at least one handwriting of the handwritten character in the database according to the Chinese character code corresponding to the handwritten character, and showing a stroke order of a handwriting of the input character from the database on the screen according to the Chinese character code.

9. The electronic device according to claim 8, wherein the at least one handwriting and the at least one stroke order are stored as an animation file or an image file.

10. The electronic device according to claim 8, wherein the at least one handwriting belongs to a vector font and the at least one stroke order is derived from the at least one handwriting of a type in the vector font.

11. The electronic device according to claim 8, wherein the processing module is used to show the stroke order of the handwriting of the input character from the database on the screen in order to follow an instruction to prompt.

12. The electronic device according to claim 8, wherein the at least one stroke order of the at least one handwriting of the Chinese characters comprises a predetermined stroke order, or the predetermined stroke order and a user-defined stroke order of the handwritten character, and the at least one handwriting of the Chinese characters stored in the database comprises a predetermined handwriting, or the predetermined handwriting and a user-defined handwriting of the handwritten character.

13. The electronic device according to claim 8, wherein the processing module is used to show the stroke order of the handwriting of the input character within a specific area of the screen.

14. A non-transitory storage medium, storing a computer program comprising a plurality of program instructions suitable for being loaded into an electronic device having a phonetic transcription input method installed and comprising a database for storing codes of Chinese characters and at least one stroke order of at least one handwriting of each of the Chinese characters, for executing the program instructions to perform the following steps:

starting a handwriting input function provided by the electronic device;

identifying, by the electronic device, a handwritten character input through the phonetic transcription input method;

obtaining, by the electronic device, at least one Chinese character code corresponding to the handwritten character from the database;

recording, by the electronic device, an input process of the handwritten character into the at least one handwriting of the handwritten character and the at least one stroke order of the at least one handwriting of the handwritten character in the database, according to the Chinese character code corresponding to the handwritten character; and showing, by the electronic device, a stroke order of a handwriting of the input character from the database according to the Chinese character code.

15. The non-transitory storage medium according to claim 14, wherein the at least one handwriting and the at least one stroke order are stored as an animation file or an image file.

16. The non-transitory storage medium according to claim 14, wherein the at least one handwriting belongs to a vector font and the at least one stroke order is derived from the at least one handwriting of a type in the vector font.

17. The non-transitory storage medium according to claim 14, wherein the step of showing the stroke order of the handwriting of the input character from the database is performed in order to follow an instruction to prompt.

* * * * *